United States Patent [19]
Burckhardt et al.

[11] 3,947,712
[45] Mar. 30, 1976

[54] FREQUENCY TRANSMITTER FOR SIGNALING THE SLIPPAGE OF VEHICLE WHEELS

[75] Inventors: Manfred H. Burckhardt, Waiblingen; Walter Lutze, Esslingen; Paul Schwerdt, Esslingen-Hegensberg, all of Germany

[73] Assignee: Daimler-Benz Aktiengesellschaft, Germany

[22] Filed: Jan. 19, 1972

[21] Appl. No.: 219,018

[30] Foreign Application Priority Data
Jan. 26, 1971  Germany.......................... 2103381

[52] U.S. Cl. .............................................. 310/168
[51] Int. Cl.² ....................................... H02K 19/20
[58] Field of Search .......... 310/168, 162, 169, 163, 310/170, 164, 171, 83, 88, 96; 322/47

[56] References Cited
UNITED STATES PATENTS

| | | | |
|---|---|---|---|
| 3,487,247 | 12/1969 | Scheffler | 310/168 |
| 3,500,091 | 3/1970 | Jones | 310/168 |
| 3,541,368 | 11/1970 | Jones | 310/168 |
| 3,604,966 | 9/1971 | Liggett | 310/168 |
| 3,649,859 | 3/1972 | Watt | 310/168 |
| 3,652,886 | 3/1972 | Riordan | 310/168 |

*Primary Examiner*—R. Skudy
*Attorney, Agent, or Firm*—Craig & Antonelli

[57] ABSTRACT

A frequency transmitter combined with a differential gear for the transmission of signals to control the slippage of wheels of motor vehicles, which consists of a rotating toothed ring member secured at the circumference of each output shaft of the differential gear, cooperating with a stationary toothed disc that is arranged in the bearing cover of the differential gear between the bearing for the spur bevel gear and a retaining ring or the like providing a seal with respect to the outside.

14 Claims, 1 Drawing Figure

U.S. Patent    March 30, 1976    3,947,712
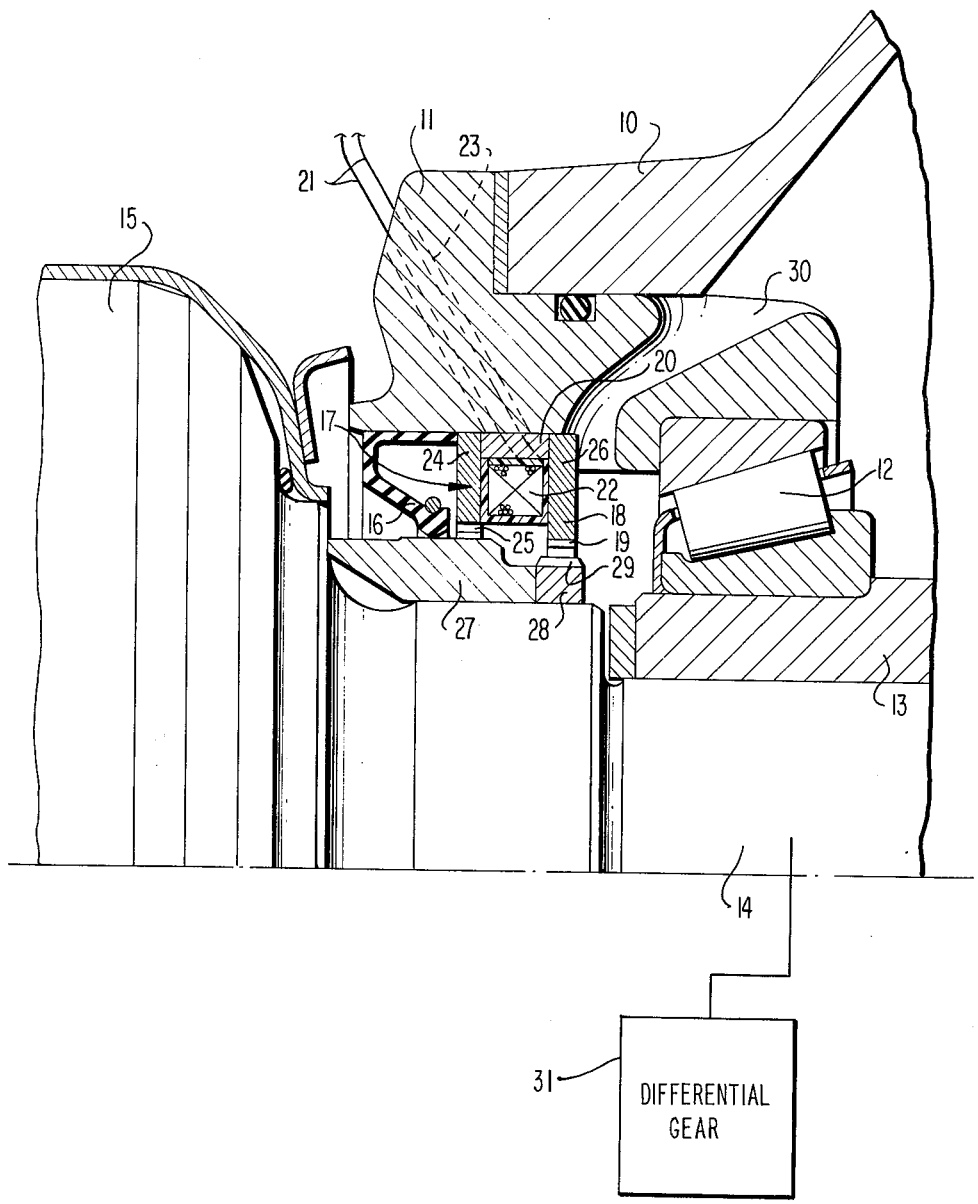

FREQUENCY TRANSMITTER FOR SIGNALING THE SLIPPAGE OF VEHICLE WHEELS

The present invention relates to a frequency transmitter combined with the differential gear for the transmission of signals to control the slippage of the wheels of motor vehicles, which consists of two toothed arrangements cooperating with one another, of which one is non-rotatably arranged whereas the other rotates, whereby one of the two toothed arrangements is magnetically excitable.

It is known to arrange such types of pulse transmitters, so-called sensors at the differential gear of a motor vehicle. They are thereby driven for the most part by an intermediate drive, i.e., they are disposed coaxially with respect to the shafts of the differential gear, and under certain circumstances even with respect to the Cardan shaft. These prior art arrangements entail the disadvantage of a relatively complicated construction and complex assembly.

The present invention is concerned with the task to avoid the described disadvantages. It solves the underlying problems with the arrangements of the aforementioned type in that a rotating toothed means is secured at the circumference of each output shaft of the differential gear, which cooperates with a stationary toothed means that is arranged in the bearing cover of the differential gear between the bearing for the axle drive bevel wheel and a retaining ring or similar oil seal providing a seal with respect to the outside.

The construction of the present invention offers the advantage that frequency transmitters with high pulse number and high indicating accuracy can be structurally combined in a simple manner with the differential gear. In that connection, each wheel is then sensed by a frequency transmitter.

The assembly and also the manufacture of such an arrangement is simple and relatively inexpensive.

In principle such types of frequency transmitters may be constructed both with passive excitation-generation of the magnetic field by means of a coil with the aid of a superimposed d.c. current—as also as so-called active frequency transmitter—generation of the magnetic field by a permanent magnet. This will become perceptible in the construction of the frequency transmitter according to the present invention exclusively in a corresponding material selection.

In one embodiment according to the present invention the stationary part arranged in the bearing cover consists of a U-shaped ring open toward the inside which is constituted by a disc-shaped armature with teeth at the inner circumference, by a spacer sleeve and a disc member closing the magnetic circuit. A coil preferably without a winding body is arranged according to the present invention on the inside of this ring. The entire described package is pressed against a ring shoulder of the bearing cover by the pressed-in retaining ring or the like.

The armature which at the inner circumference forms or receives the teeth, consists in a "passive" frequency transmitter of a stamped-out disc of soft magnetic iron. With an "active" frequency transmitter a permanent magnet material is used which is manufactured by stamping or sintering and is magnetized in the radial direction. The disc part abutting at the retaining ring serves the purpose to close the magnetic circuit. With a "passive" frequency transmitter this disc part consists of soft magnetic iron. With an "active" frequency transmitter either a soft magnetic iron or also a permanent magnet material—for the reinforcement of the magnetic flux—may be utilized which is magnetized radially in the reverse direction as the armature.

It is further proposed by the present invention that the spacer sleeve be provided with a longitudinal slot through which are guided the connecting wires of the coil and that an inclined bore in the bearing cover serves for the further guidance of the connecting wires toward the outside. Also this slotted spacer sleeve serves, as to the rest, to close the magnetic circuit.

The passage of the connecting wires through the slot can be cast out with synthetic material, such as, for example, conventional synthetic resinous materials known for that purpose.

According to a further feature of the present invention a bushing with press or force fit or the like is mounted on the shaft, on which rotates the retaining ring and which simultaneously closes the magnetic circuit. Furthermore, it is additionally proposed that a ring be mounted on the shaft with a press or force fit or the like which forms the teeth and is disposed in the same plane perpendicular to the axis as the armature. Of course, it is also possible to combine these two parts into a common unitary part. However, it is proposed in any case that the bushing or the part serving as running surface for the retaining ring has a larger outer diameter than the ring with its teeth. It is achieved in this manner that the retaining ring is not damaged during the assembly when pushing through the toothed arrangement. Finally, a further proposal of the present invention goes to the effect that the disc abutting at the retaining ring is provided at the inner circumference with uniformly distributed grooves for the passage of oil. In this manner a continuous oil flow through the frequency transmitter to the retaining ring and vice versa can be achieved so that the latter is well cooled.

Accordingly, it is an object of the present invention to provide a frequency transmitter for the transmission of signals to control the slippage of wheels in motor vehicles which avoids by simple means the aforementioned shortcomings and drawbacks encountered in the prior art.

Another object of the present invention resides in a frequency transmitter for the signal transmission to control the slippage of the wheels of motor vehicles which avoids relatively complicated constructions and time consuming assemblies.

A further object of the present invention resides in a frequency transmitter of the type described above which is capable of producing a high pulse repetition rate together with high accuracy while permitting a relatively simple and inexpensive assembly and manufacture.

Another object of the present invention resides in a frequency pick-up for the signal transmission to control the slippage of wheels in motor vehicles which permits an easy assembly without damage to any of the parts while at the same time enabling completely satisfactory cooling of those parts likely to be heated during operation.

These and further objects, features and advantages of the present invention will become more apparent from the following description when taken in connection with the accompanying drawing which shows, for purposes of illustration only, one embodiment in accordance with the present invention, and wherein:

The single FIGURE is a partial longitudinal cross sectional view through a frequency transmitter in accordance with the present invention.

Referring now to the single FIGURE of the drawing, the bearing 12 for the spur bevel gear or differential housing 13 is mounted in the axle gear housing 10 of the rear axle of a motor vehicle by means of the bearing cover 11. The output or driven shaft 14 of the differential gear shown schematically at 31 extends through the spur bevel gear housing 13 and passes over in this case directly into the joint part 15 of a synchronous joint of conventional construction. The arrangement, of course, is symmetrical to the longitudinal center plane of the differential gear.

The frequency transmitter generally designated by reference numeral 17 is additionally arranged in the bearing cover 11 between the bearing 12 and a retaining ring 16 providing an oil seal with respect to the outside. The stationary part of the frequency transmitter 17 consists of a disc-shaped armature 18 which is provided at the inner circumference with teeth 19. A spacer sleeve 20 is slotted in the longitudinal direction so that the connecting wires 21 of the winding 22, devoid of a winding body, can be extended therethrough. An inclined bore 23 serves for the further guidance of the connecting wires in the bearing cover 11. On the other side of the coil 22 is arranged a disc part 24 which is provided with longitudinal grooves 25 at the inner circumference thereof. The entire package described so far is pressed firmly against an annular shoulder 26 of the bearing cover 11 by the retaining ring 16 of any conventional construction and forms the stator of the frequency transmitter 17.

A rotor is formed by a sleeve 27 which is pressed onto the shaft 14 and on the outer circumference of which runs the retaining ring 16. The sleeve 27 receives the magnetic flux from the disc member 24 and transmits the magnetic flux to a ring member 28 which is again pressed onto the shaft 14 and is provided at its outer circumference with the teeth 29. This ring 28 is disposed in the same plane perpendicular to the axis as the armature 18 so that the two toothed arrangements 19 and 29 are disposed directly opposite one another.

The operation of such a frequency transmitter is known as such and a detailed description is therefore dispensed with herein. However, it should be mentioned that one or several apertures 30 in the bearing cover 11 serve for an adequate flow of the oil to the frequency transmitter. The oil flows through the teeth as well as through the longitudinal grooves 25 in the disc member 24 to the retaining 16 so that the latter can be kept adequately cooled. A certain circulation is formed thereby so that oil constantly flows to and from.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A frequency transmitter combined with a differential gear for the transmission of signals to control the slippage of wheels of motor vehicles, which includes two mutually cooperating toothed means of which one toothed means is rotatably arranged whereas the other does not rotate, and with one of the toothed means adapted to be magnetized, characterized in that the rotating toothed means is secured at the circumference of each output shaft of the differential gear, said rotating toothed means cooperating with a fixed toothed means which is arranged in a bearing cover means of the differential gear between a bearing for a spur bevel gear housing and a retaining ring means providing an oil seal with respect to the outside.

2. A frequency transmitter according to claim 1, characterized in that the fixed toothed means consists of a U-shaped ring open toward the inside which is formed by a disc-shaped armature with teeth, a spacer sleeve and a disc member closing the magnetic circuit.

3. A frequency transmitter according to claim 2, characterized in that said ring accommodates on the inside thereof a winding.

4. A frequency transmitter according to claim 3, characterized in that said winding is devoid of a winding body.

5. A frequency transmitter according to claim 3, characterized in that the spacer sleeve includes a longitudinal slot through which are extended the connecting wires of the winding, and in that an inclined bore in the bearing cover means serves for the further extension of the connecting wires toward the outside.

6. A frequency transmitter according to claim 5, characterized in that a sleeve means is mounted on the output shaft with a force fit, the retaining ring means running on said sleeve means and said sleeve means closing the magnetic circuit.

7. A frequency transmitter according to claim 6, characterized in that a further ring means is mounted on the output shaft with force fit, which forms the teeth and is disposed in the same plane normally to the axis as the armature.

8. A frequency transmitter according to claim 7, characterized in that the sleeve means has a larger diameter than the further ring means with the teeth.

9. A frequency transmitter according to claim 8, characterized in that the disc member is provided with uniformly distributed grooves at the inner circumference thereof for the passage of oil.

10. A frequency transmitter according to claim 1, characterized in that a sleeve means is mounted on the output shaft with a force fit, the retaining ring means running on said sleeve means and said sleeve means closing the magnetic circuit.

11. A frequency transmitter according to claim 10, characterized in that a further ring means is mounted on the output shaft with force fit, which forms the teeth and is disposed in the same plane normally to the axis as the armature.

12. A frequency transmitter according to claim 11, characterized in that the sleeve means has a larger diameter than the further ring means with the teeth.

13. A frequency transmitter according to claim 2, characterized in that the disc member is provided with uniformly distributed grooves at the inner circumference thereof for the passage of oil.

14. A frequency transmitter according to claim 1, characterized in that a further ring means is mounted on the output shaft with force fit, which forms the teeth and is disposed in the same plane normally to the axis as the armature.

* * * * *